UNITED STATES PATENT OFFICE.

SIMEON WHITON, OF HARTFORD, CONNECTICUT.

IMPROVEMENT IN MAKING VEGETABLE BEER.

Specification forming part of Letters Patent No. 4,430, dated March 21, 1846.

*To all whom it may concern:*

Be it known that I, SIMEON WHITON, of Hartford, in the county of Hartford and State of Connecticut, have invented a new and useful combination of ingredients to be used in making Cream Nectar, or a Vegetable Transparent Beer; and I do hereby declare that the following is a full, clear, and exact description of the same.

The recipe I give as a part of my specification describes the exact proportion of the ingredients I use, and the sample I give contains each and all the ingredients in the exact proportion as contained in the following recipe for twenty gallons, to wit: ginger, eight ounces; dried pumpkin, four pounds; peanuts or walnuts, one quart; sweet corn, one quart; cream of tartar, four ounces; sugar, ten pounds; essence pipsissewa, one ounce; yeast, six gills; water, twenty gallons.

The art of preparing the raw materials for use I describe as follows: The pumpkin, when ripe, to be cut in thin circular strips and dried by hanging in the upper loft of any building with a free circulation of air; the peanuts to be baked and ground coarse; if walnuts are used, to be ripe, dry, and mashed; the sweet corn to be ripe, baked, and ground.

Directions for making the beer: Boil the pumpkin, nuts, and sweet corn, as described, in a closed bag of coarse cloth one and a half hours with two gallons of water; then add two quarts of cold water with the ginger in a bag of fine cloth; let it steep half an hour and boil five minutes; rinse and wring the bags in cold water and use the liquor; mix the cream of tartar, essence pipsissewa, and sugar in the vessel to contain the beer; pour the liquor of ginger, &c., boiling hot on the sugar, &c.; stir it well; then add hot and cold water sufficient to make twenty gallons of liquor of 80° heat, add six gills yeast, and when well worked skim off the barm and bottle for use.

I do not claim as my invention, the combination of all the above-named ingredients, for some of them have been known and used before; but What I do claim as my invention, and desire to secure by Letters Patent, is—

The combination of the four following ingredients, or either two of them, with the above, namely: cream of tartar, pumpkin, nuts, and sweet corn, substantially as set forth in the foregoing specification, for the manufacture of vegetable transparent beer.

SIMEON WHITON.

Witnesses:
W. W. ELLSWORTH,
ARCHELAUS WILSON.